United States Patent [19]

Capuano

[11] 4,431,353
[45] Feb. 14, 1984

[54] FASTENER ASSEMBLY

[75] Inventor: Terry D. Capuano, Hinckley, Ohio

[73] Assignee: Russell Burdsall & Ward Corporation, Mentor, Ohio

[21] Appl. No.: 268,124

[22] Filed: May 28, 1981

[51] Int. Cl.³ .................. F16B 37/00; F16B 39/04
[52] U.S. Cl. ................... 411/11; 411/134; 411/533; 411/537; 10/86 R
[58] Field of Search ............ 411/9, 10, 11, 14, 131, 411/134, 135, 155, 156, 432, 533, 534, 537, 538, 544, 545

[56] References Cited

U.S. PATENT DOCUMENTS

| | | |
|---|---|---|
| Re. 19,492 | 3/1935 | Winchester et al. |
| 2,588,372 | 3/1952 | Erb . |
| 3,016,941 | 9/1958 | Coldren . |
| 4,293,256 | 10/1981 | Pamer ................................. 411/11 |
| 4,362,449 | 12/1982 | Hlinsky ............................. 411/537 |

Primary Examiner—Gary L. Smith
Assistant Examiner—Neill Wilson
Attorney, Agent, or Firm—Yount & Tarolli

[57] ABSTRACT

An improved fastener assembly may be used to mount a vehicle wheel on a hub. The fastener assembly includes a nut which is rotatable relative to a washer to enable the fastener assembly to be tightened without marring the wheel. The washer has an annular collar which is loosely connected with the nut by a retainer section which extends from one axial end portion of the nut. The nut and washer collar have abutting annular load transmitting surface areas. The washer also has an annular load transmitting and indicating section which extends radially outwardly from the collar. The load transmitting and indicating section includes a bearing section and a spring section. The spring section flares radially and axially outwardly from the bearing section. When the fastener assembly is tightened with a predetermined preload, the spring section is flattened to provide a visual indication that the desired preload has been applied. Flattening the spring section maximizes the surface area for transmitting the preload to the wheel. The resiliently deflectable spring section may be provided with undulations which are also flattened by the desired preload. In order to minimize the axial extent of the fastener assembly, an inner end surface of the nut is disposed radially inwardly of the top and bottom surfaces of the bearing and spring sections when the fastener assembly is tightened.

37 Claims, 13 Drawing Figures

FASTENER ASSEMBLY

BACKGROUND OF THE INVENTION

The present invention relates to a new and improved fastener assembly. Although the fastener assembly may be used in many different environments, it is advantageously used to connect a wheel of a vehicle with a hub.

A known fastener assembly for connecting a wheel of a vehicle with a hub is disclosed in U.S. Pat. Re. No. 19,492. This fastener assembly includes a nut which engages a hub bolt. A cup-shaped washer is provided between the nut and the wheel of the vehicle. The cup-shaped washer has a relatively large axial extent and flares outwardly to enable the washer to be resiliently compressed as the nut is tightened. Compression of the washer tends to hold the nut against vibrating loose during operation of the vehicle. The axial extent of this known fastener assembly is relatively large due to the relatively large axial extent of the cup-shaped washer. In addition, this known fastener assembly has a relatively small bearing surface area at one end of the cup-shaped washer.

The relatively large axial extent of the fastener assembly disclosed in U.S. Pat. Re. No. 19,492 may not be objectionable under certain conditions. However, when the fastener assembly is used to mount a front wheel of a vehicle, the fastener assembly must fit within a relatively short axial distance in order to be disposed within a maximum overall width dimension of the vehicle. To enable this known fastener assembly to fit within a relatively limited space, it has been suggested that the length of the nut be reduced. This results in a substantial reduction in the size of the wrenching flats on the nut. If the nut becomes rusted in place and/or if a worn socket or wrench is used to engage the small wrenching flats, the nut may tend to strip and/or the corners of the nut may be rounded.

When this known fastener assembly is used to mount decorative wheels formed of aluminum or similar materials, the relatively small bearing surface area at the end of the cup-shaped washer concentrates the preload force applied to the wheel. This can result in scuffing or marring of the decorative wheels. The extent to which the wheels are marred is substantially increased if the cup-shaped washer turns with the nut as the nut is tightened. Any tendency for the washer to mar a decorative wheel is increased if the central axis of the hub bolt or stud is not exactly perpendicular to the side surface of the wheel.

SUMMARY OF THE PRESENT INVENTION

The present invention provides a new and improved fastener assembly which can be used for many different purposes and is particularly well adapted to connect a wheel of a vehicle with a hub. Although it is contemplated that a fastener assembly constructed in accordance with this invention could be a bolt, in the specific embodiment of the invention described herein, the fastener assembly includes a nut and washer.

In order to minimize the combined axial extent of the nut and washer while at the same time providing relatively large wrenching flats to enable the nut to be loosened, an axially and radially outwardly flaring spring section of the washer is resiliently flattened when a predetermined preload force is applied against the washer by the nut. After the spring section has been flattened, an axial end surface of the nut is disposed in a space between planes containing the top and bottom surfaces of the spring section.

Flattening of the washer provides a visual indication that the desired preload has been applied. In addition, the resilient flattening of the washer results in a locking action which tends to hold the nut against vibrating loose during rotation of the wheel. Flattening of the washer also tends to maximize the surface area available for transmitting the preload force and to minimize marring of the wheel.

In order to enable the fastener assembly to accommodate misalignment between a bolt or stud and the side surface of a wheel, the washer has a collar which loosely engages a retainer section which extends from one axial end portion of the nut. Upon tightening of the nut onto a slightly skewed bolt or stud, the nut can tilt relative to the washer. In order to accommodate this tilting movement, the preload force is transmitted between the nut and the washer by abutting engagement between annular load transmitting surface areas on the nut and the collar of the washer. The annular load transmitting surface areas flare radially and axially outwardly and may have a frustoconical or spherical configuration.

Accordingly, it is an object of this invention to arovide a new and improved fastener assembly which has a minimum axial extent compatible with providing adequate wrenching flats, which provides a clear visual indication when the fastener assembly has been tightened with a desired perload, and which tends to maximize the surface area available for transmitting the preload to a member clamped in place by the fastener assembly.

Another object of this invention is to provide a new and improved fastener assembly which includes a resiliently deflectable washer which is flattened by the application of a predetermined preload to the washer by a body of the fastener and wherein an end surface area of the body of the fastener is disposed between top and bottom side surfaces of the flattened washer when the predetermined preload has been applied to the washer.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Fastener Assembly

An improved fastener assembly 20 (see FIGS. 1 and 2) constructed in accordance with the present invention can be used in many different environments. However, the fastener assembly 20 is advantageously used to connect wheel assemblies 22 and 24 (FIG. 1) with the rotatable hub 26 of a vehicle. The wheel assemblies 22 and 24 include metal wheels 28 and 30 having central wheel discs 32 and 34 which are clamped against the hub 26 by engagement of the fastener assembly 20 with a hub bolt 36. The wheels 28 and 30 have annular metal rims 40 and 42 upon which rubber tires 44 and 46 are mounted in a known manner.

In one preferred embodiment of the invention, the fastener assembly 20 includes a nut 50 (FIG. 2) and a washer 52 which are rotatable relative to each other. This enables the nut 50 to be turned onto the hub bolt 36 (FIG. 1) without marking the wheel 30. Thus, as the nut 50 is tightened onto the bolt 36, friction forces between the washer 52 and the wheel disc 34 hold the washer against rotation. The somewhat smaller friction forces between the nut 50 and washer 52 enable the nut to turn relative to the washer. If desired, a suitable lubricant may be provided between the nut 50 and washer 52.

Figure 3:
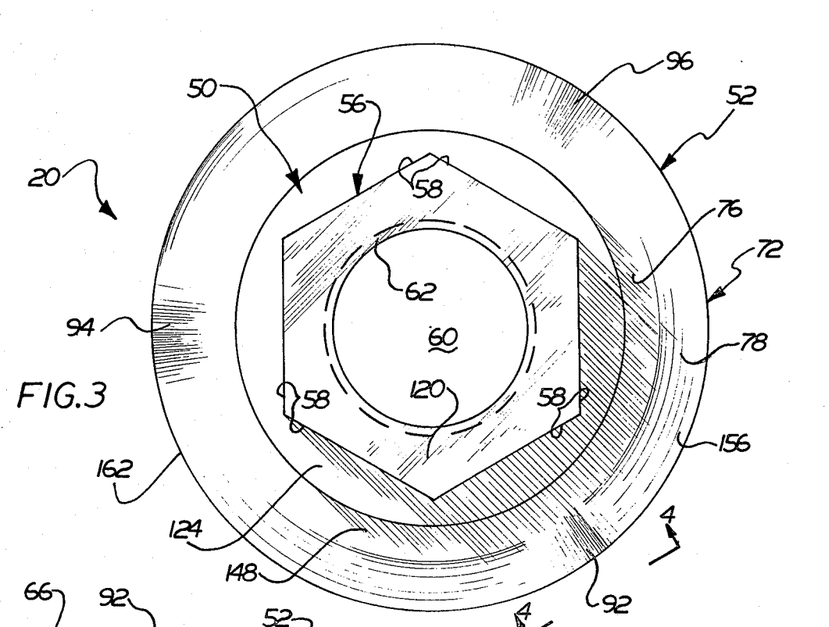
FIG. 3 is a plan view, taken generally along the line 3—3 of FIG. 2 on a somewhat reduced scale.

The nut 50 includes a body 56 upon which wrenching flats or surfaces 58 are disposed in a hexagonal array (see FIG. 3). A central passage or opening 60 extends through the nut body 56. A thread convolution 62 is formed along the side of the passage 60 and extends through the center of the nut body 56.

The washer 52 has an annular collar 66 (FIG. 2) which circumscribes a retainer section 68 projecting from one axial end portion of the nut body 56. The retainer secton 68 cooperates with the collar 66 to loosely hold the washer 52 on the nut 50.

In addition to the collar 66, the washer 52 has an annular load transmitting and indicating section 72 which projects radially outwardly from the collar 66. The load transmitting and indicating section 72 includes an annular bearing section 76 which extends across one end of the collar 66 and an annular spring section 78 which flares radially and axially outward from the bearing section 76. Although the washer 52 has been illustrated as being connected with a nut 50, it is contemplated that the washer could be connected with a head end or body of a bolt and the hub 26 provided with a suitable threaded opening to receive the threaded shank of the bolt.

Figures 4, 5, 6:
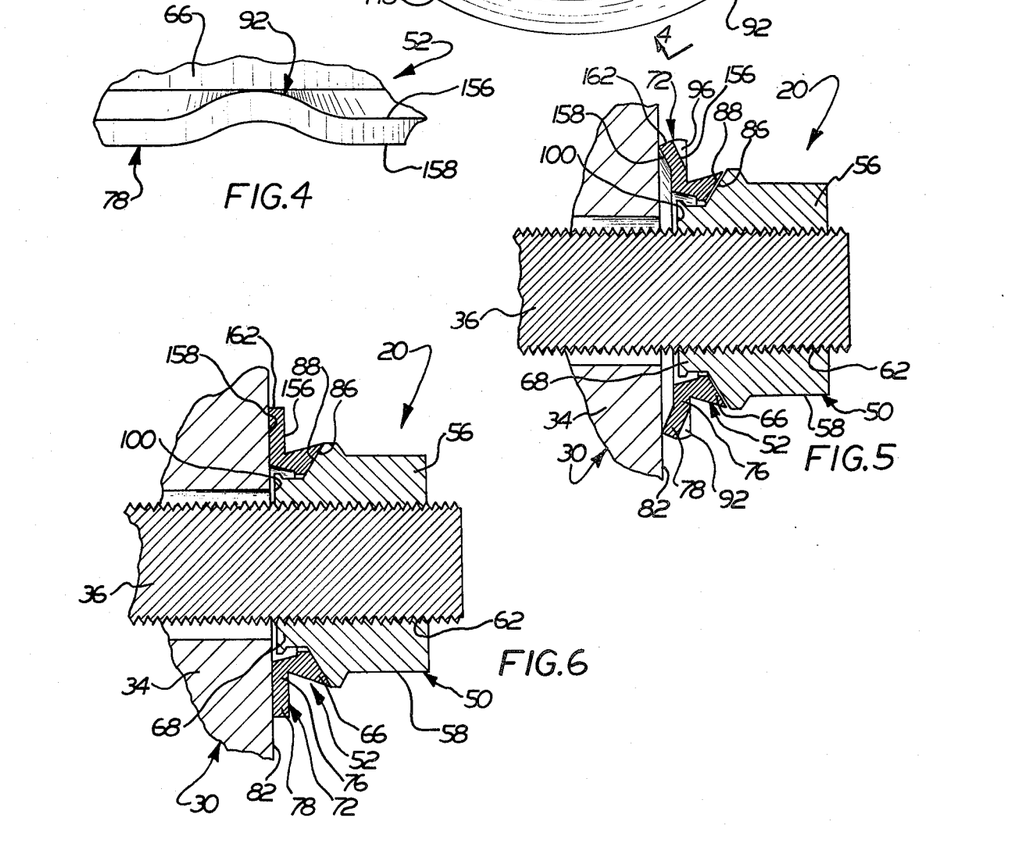
FIG. 4 is an elevational view, taken generally along the line 4—4 of FIG. 3, illustrating the configuration of an undulation formed in a resiliently deflectable spring section of the washer.
FIG. 5 is a fragmentary sectional view, taken on a reduced scale, illustrating the fastener assembly of FIGS. 2 and 3 prior to the application of a preload to the fastener assembly.
FIG. 6 is a fragmentary sectional view, generally similar to FIG. 5, illustrating the fastener assembly after the predermined preload has been applied to the fastener assembly.

When the fastener assembly 20 is turned onto the hub bolt 36 (FIG. 1), the annular washer 52 moves into initial engagement with a flat side surface 82 of the wheel disc 34 (see FIG. 5). Due to the frustoconical flaring configuration of the spring section 78, a leading corner of the spring section moves into initial engagement with the side surface 82 of the wheel disc 34. At this time, the bearing section 76 is spaced from the side surface 82 of the wheel 30.

Figures 1, 2:
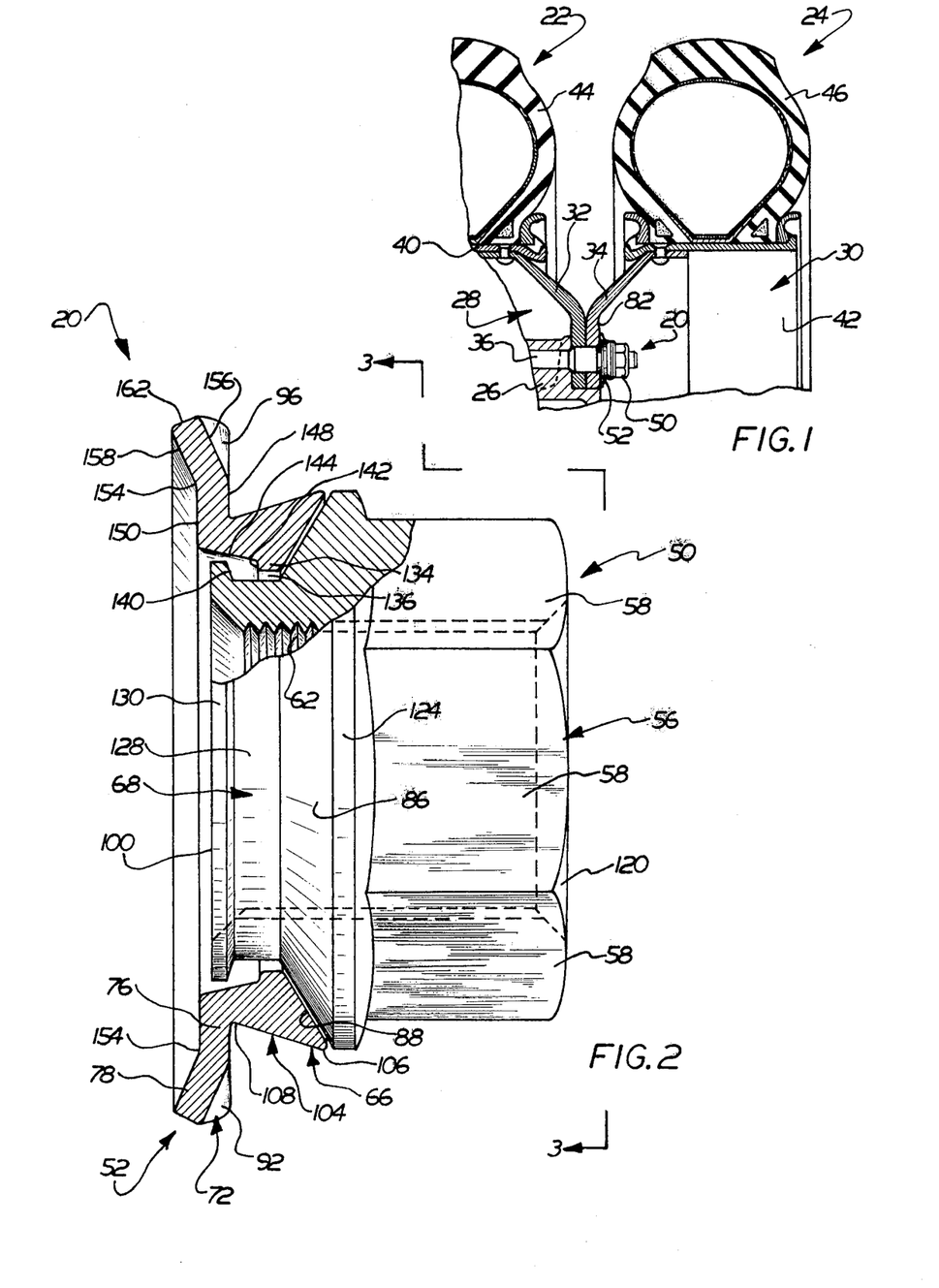
FIG. 1 is a fragmentary sectional illustration of the manner in which a fastener assembly constructed in accordance with the present invention may be used to connect one or more wheels with the hub of a vehicle.
FIG. 2 is an enlarged sectional view of the fastener assembly of FIG. 1 and illustrating the relationship between a nut and a resiliently deflectable washer.

Continued rotation of the nut 50 relative to the hub bolt 36, results in a preload force being transmitted from a frustoconical force transmitting surface area 86 on the nut body 56 to a similarly shaped frustoconical force transmitting area 88 on the outer end portion of the collar 60. Frictional forces between the flaring spring section 78 and the wheel disc 34 hold the washer 52 against rotation relative to the wheel disc. Therefore, the force transmitting surface area 86 on the nut body 56 rotates along the similarly shaped force transmitting area 88 on the washer collar 66. If desired, a sliding action between the two force transmitting surfaces 86 and 88 can be promoted by applying a suitable lubricant to the force transmitting surfaces.

As the nut body 56 continues to be turned onto the hub bolt 36, the spring section 78 is resiliently deflected from the frustoconical configuration of FIG. 5 toward the fully flattened configuration of FIG. 6. When a desired preload force has been applied to the washer 52 by the nut 50, the spring section 78 is fully flattened (see FIG. 6) so that it is radially aligned with the bearing section 76. Flattening of the spring section 78 provides a clear visual indication that the desired preload force has been applied against the wheel 30 by the fastener assembly 20.

Since the preload force is applied against the wheel 30 by both the spring section 78 and the bearing section 76, the preload force is applied over a relatively large area of the wheel to thereby tend to minimize stress concentrations and marring of the wheel. It is believed that this feature of the fastener assembly 20 will be particularly advantageous when the fastener assembly is used to mount a decorative wheel of aluminum or similar material.

When the fastener assembly has been tightened (see FIG. 6) to clamp the wheel 30 in place, the resiliently deflected spring section 78 provides a locking action which resists loosening of the fastener assembly 20 under the influence of vibrations during rotation of the wheel. However, if the fastener assembly should become loose, the resulting reduction in the preload force applied against the wheel by the washer 52 will allow the spring section 78 to resiliently spring back. This results in movement of the spring section 78 from the fully flattened condition shown in FIG. 6 toward the unloaded condition shown in FIGS. 2 and 5. The outward flexing movement of the spring section 78 results in the spring section moving out of radial alignment with the bearing section 76 to thereby provide a visual indication of loosening of the fastener assembly 20.

Although the extent of deflection of the spring section 78 from the unloaded condition of FIG. 5 to the fully loaded condition of FIG. 6 indicates when a desired preload has been applied to the fastener assembly 20, it is contemplated that an additional indication may be desirable. To this end, a plurality of undulations 92, 94, and 96 (FIG. 3) are provided in the spring section 78. When the spring section 78 is in the unloaded condition, the undulations 92-96 project axially outwardly from the conically flaring spring section 78 toward the collar 66 (FIGS. 2 and 5). Upon tightening of the fastener assembly 20 with the desired preload force, the undulations 92, 94 and 96 are resiliently flattened (FIG. 6).

Relieving of the preload force applied by the washer 52 against the wheel 30 results in the undulations 92, 94 and 96 returning toward the initial configuration to provide a clearly visible indication that the fastener assembly 20 has begun to loosen. It should be noted that when the desired preload force is applied against the washer 52, the undulations 92, 94 and 96 are flattened to maximize the surface area available on the spring section 78 to clamp the wheel 30 against the hub 26. The manner in which the undulations 92, 94 and 96 are formed in the spring section 78 and in which they are flattened is generally the same as is described in copending U.S. patent application Ser. No. 092,648, filed Nov. 9, 1979 by Walter R. Pamer and entitled "Load Indicating Fastener".

In accordance with one of the features of the present invention, the overall axial extent of the fastener assembly 20 is minimized when the fastener assembly is tightened against the wheel 30. Thus, when the fastener assembly 20 has been tightened as shown in FIG. 6 to apply a predetermined preload against the wheel, an annular axial end surface 100 (FIG. 2) on the connector section 68 of the nut 50 is disposed in a plane which is located midway between upper and lower side surfaces of the flattened load indicating section 72 (see FIG. 6).

When the fastener assembly 50 is in the unloaded condition shown in FIGS. 2 and 5, the axially and radially flaring spring section 78 is disposed a substantial axial distance beyond the annular end surface 100 on the nut 50. As the nut 50 is tightened onto the wheel bolt 36, the spring section 78 is flattened and the axially inner end surface 100 on the nut moves toward the flat side surface 82 of the wheel 30. As this occurs, the overall axial extent of the fastener assembly 20 is reduced.

When the spring section 78 is fully flattened (see FIG. 6), the surface 100 is parallel to and disposed closely adjacent to the side surface 82 of the wheel 30. This tends to minimize the overall axial extent of the fastener assembly 20. Although the overall height of the fastener assembly 20 is minimized, the wrenching flats 58 have a relatively large axial extent to enable the nut body 56 to be securely gripped by a wrench and loosened even though the fastener assembly becomes rusted in place.

In accordance with another feature of the invention, the washer collar 66 is undercut to minimize the weight of the washer 52 and to promote the resilient spring action on the part of the collar when the fastener assembly 20 is tightened. Thus, the collar 66 has a frustoconical outer side surface 104 (see FIG. 2) which tapers radially and axially inwardly from a relatively large diameter circular outer end portion 106 to a relatively small diameter circular inner end portion 108 where the bearing section 76 extends across the inner end of the collar 66. The reduced cross sectional configuration of the collar 66 at the junction 108 between the collar and the bearing section 76 facilitates flexing of the collar under the influence of axially inward and radially outward forces applied against the collar by the load transmitting surface area 86 on the nut body 56.

In accordance with still another feature of the present invention, the frustoconical load transmitting surface areas 86 and 88 on the nut 50 and washer 52 cooperate to enable the fastener assembly 20 to apply a predetermined preload against the wheel 30 even though the hub bolt 36 and wheel 30 may be slightly misaligned. The manner in which the load transmitting surfaces 86 and 88 on the nut 50 and washer 52 cooperate when the hub bolt 36 and wheel 30 are misaligned has been illustrated schematically in FIG. 7.

Figures 7, 8, 9:
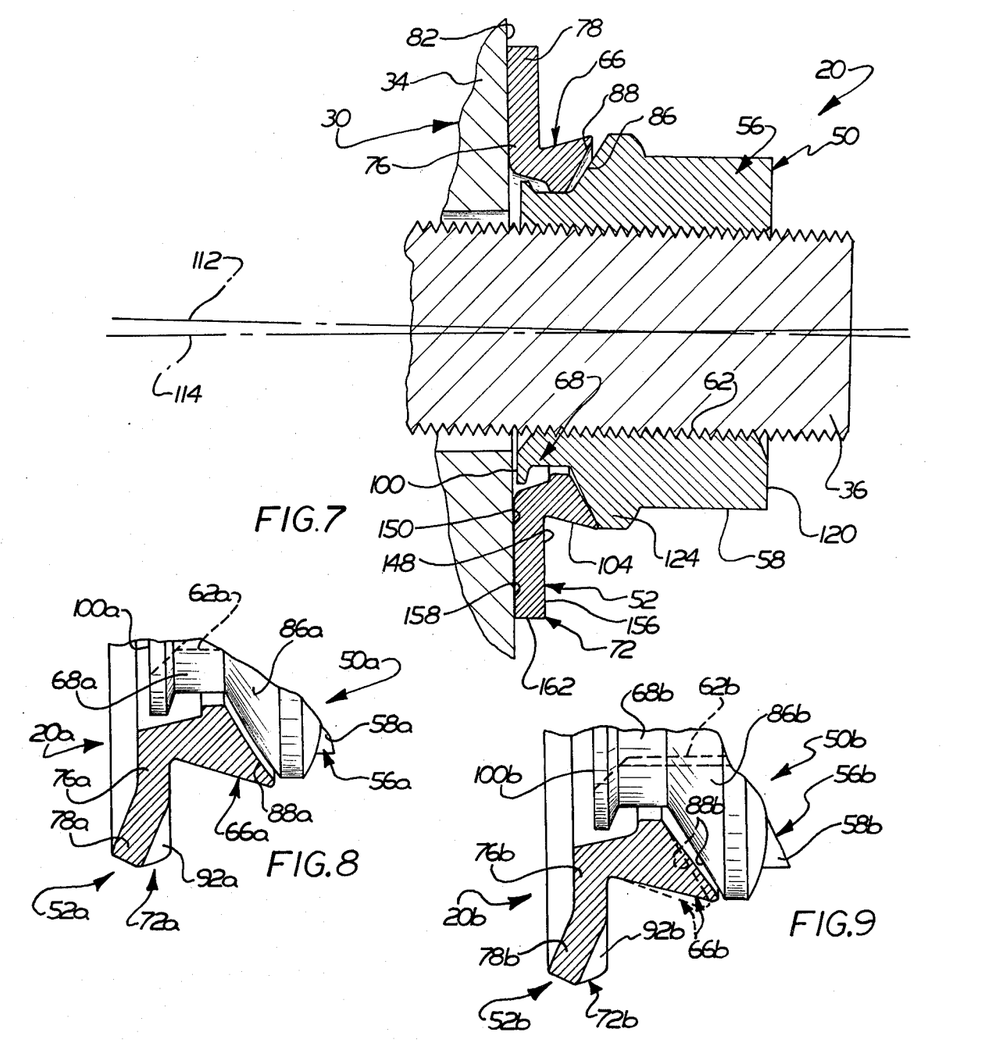
FIG. 7 is a fragmentary sectional view, generally similar to FIGS. 5 and 6 but on a somewhat enlarged scale, illustrating the relationship between the fastener assembly and a skewed hub bolt.
FIG. 8 is a fragmentary sectional view of an embodiment of the invention in which a washer and a nut have load transmitting surface areas which form portions of a sphere.
FIG. 9 is a fragmentary sectional view of an embodiment of the invention in which a washer and a nut have load transmitting surface areas which extend at acute angles relative to each other prior to the application of a preload force.

The central axis of the skewed hub bolt 36 has been indicated at 112 in FIG. 7. The central axis 112 of the hub bolt 36 extends at an acute angle to an axis 114 which is perpendicular to the outer side surface 82 of the wheel. Due to the skewed orientation of the hub bolt 36, the nut body 56 is cocked slightly relatively to the washer 52. This results in a slight misalignment, which has been exaggerated for purposes of illustration in FIG. 7, between the load transmitting surface areas 86 and 88 on the nut body 56 and washer 52.

The frustoconical configuration of the load transmitting surface areas 886 and 88 on the nut 50 and washer 52 accommodates the misaligment between the hub bolt 36 and wheel 30 to enable the desired preload to be transmitted from the nut 50 to the washer 52. Thus, although a gap has been shown between the upper portions of the surfaces 86 and 88 in FIG. 7, most misalignments between the hub bolt 36 and wheel 30 can be accommodated by merely skewing the nut body 56 slightly relative to the washer 52. When this happens radially outer portions of the frustoconical surfaces 86 and 88 on one diametrical side of the nut 50 and washer 52 are in abutting engagement. On the diametrically opposite side of the nut 50 and washer 52, a radially innner portion of the load transmitting surface areas 86 and 88 are in abutting engagement.

Nut

The metal nut 50 (FIG. 2) has a body 56 with an axially outer crown end portion 120. The crown end portion 120 is arcuately rounded and extends between the wrenching flats 58. The wrenching flats extend axially inwardly from the crown end 120 toward the washer 52 to an annular flange 124. Although it is preferred to provide the nut body 56 with the annular flange 124 in order to tent to maximize the load transmitting surface area 86, it is contemplated that the annular flange could be eliminated if desired. Of course, elimination of the annular flange 124 would tend to reduce the load transmitting surface area 86 and thereby concentrate the force transmitted from the nut 50 to the washer 52.

The load transmitting surface area 86 is the frustum of a right circular cone having a central axis which is coincident with the central axis of the nut 50 and thread convolution 62. The load transmitting surface area 86 tapers axially and radially inwardly from a maximum diameter or base at the periphery of the flange 124 to a minimum diameter at the intersection between the load transmitting surface area and the connector section 68. The provision of the flange 124 on the nut reinforces the load transmitting surface area 86 to provide for firm abutting engagement with the washer 52.

The retainer section 68 cooperates with the washer 52 to loosely hold the washer in place on the nut 50. The retainer section 68 includes a cylindrical main wall 128 (FIG. 2) which extends axially outwardly from the load transmitting surface 86. The cylindrical wall 28 of the retainer section 68 is disposed in a coaxial relationship with the thread convolution 62 and the load transmitting surface area 86. The thread convolution 62 extends through a major portion of the main wall 128 to maximize the extent of engagement of the internal thread convolution 62 and a mating external thread convolution on the hub bolt 36.

An annular retainer rim 130 projects radially outwardly from an inner end of the cylindrical wall 128. The annular rim 130 has a substantially larger diameter than the cylindrical wall and cooperates with the washer 52 to hold the washer against being pulled axially off of the nut 50. The annular rim 130 is disposed in a coaxial relationship with the main wall 128 and thread convolution 62. If desired, the load transmitting surface area 86 and retainer section 68 could be disposed on the head end of a bolt.

Washer

The metal washer 52 (FIG. 2) has an annular collar 66 which extends axially outwardly from the annular bearing section 76 and circumscribes the retainer section 68 of the nut 50. The axially outer end face of the circular collar 66 is formed by the frustoconical load transmitting surface 88. The load transmitting surface area 88 is the frustum of a right circular cone. The included angle of the cone of the load transmitting surface area 88 on the washer 52 is the same as the included angle of the cone of the load transmitting surface area 86 on the nut 50. Therefore, the load transmitting surface areas 86 and 88 are coaxial and extend parallel to each other when the fastener assembly 20 is connected with a hub bolt 36 which is aligned with a vehicle wheel 30 rather than being skewed as shown in FIG. 7.

Assuming proper alignment between the hub bolt 36 and wheel 30, the interaction between the load transmitting surface areas 86 and 88 result in the washer 52 being centered relative to the nut 50. The radial extent of the load transmitting surface area 88 on the washer 52 is almost as great as the radial extent of the load transmitting surface area 86 on the nut 50. This provides a relatively large area of abutting engagement between the washer 52 and nut 50 to minimize stress concentration.

The collar 66 has a radially inwardly projecting annular flange or nose 134. The flange 134 has an axial extent which is substantially less than the axial extent of the cylindrical retainer wall 128. The diameter of a circular inner side surface 136 on the annular flange 134 is greater than the outside diameter of the cylindrical wall 128 and less than the outside diameter of the rim 130. Due to the fact that the flange 134 has an axial extent which is smaller than the axial extent of the retainer wall 128 and an inside diameter which is greater than the outside diameter of the cylindrical retainer wall, the washer 52 is free to move axially and radially through limited distances relative to the nut 50. This enables the nut 50 and washer 50 to move relative to each other to accommodate misalignment between the hub bolt 36 and wheel 30 in the manner shown in FIG. 7.

The internal flange 134 on the washer 52 has an inside diameter which is less than the outside diameter of the retainer rim 130. Therefore, an annular axially outer side surface 140 on the annular retainer rim 130 abuttingly engages an annular underside surface 142 on the flange 134 to limit axially outward movement of the washer 52 relative to the nut 50.

In order to prevent interference and/or binding of the washer on the retainer section 68 of the nut, the washer has a radially and axially outwardly flaring frustoconical inner side surface 144. The space between the inner side surface 144 and the radially outer side surface of the retainer rim 130 enables the washer 52 to freely move axially relative to the nut 50 and to tilt sideways, through a limited distance, relative to the nut.

The annular load transmitting and indicating section 72 of the washer 52 forms a base for the collar 66 and is disposed in a coaxial relationship with the annular collar. The load transmitting and indicating section 72 includes the annular bearing section 76 which extends across the axially inner end of the collar 66. The bearing section 76 has a flat annular top or outer side surface 148 which extends radially outwardly from an axially inner end of the collar 66. The annular outer side surface 148 has inside and outside diameters which are greater than the maximum and minimum diameters of the load transmitting surfaces 86 and 88.

The bearing section 76 has a flat annular bottom or inner side surface 150 which extends parallel to the outer side surface 148. The annular inner side surface 150 has an inside diameter which is less than the maximum diameters of the load transmitting surface areas 86 and 88 and an outside diameter which is greater than the outside diameters of the load transmitting surface areas 86 and 88. This results in the preload force being transmitted axially from the nut through the washer to the wheel 30.

When the load transmitting surface areas 86 and 88 on the nut 50 and washer 52 are disposed in abutting engagement, the annular axially inner end surface 100 of the retainer section 68 is disposed in a plane which extends between the outer and inner side surfaces 148 and 150 of the bearing section 76. The annular side surface areas 148 and 150 of the bearing section 76 are disposed in a coaxial relationship with the collar 66 and load transmitting surface area 88 and extend perpendicular to their coincident central axes.

In addition to the bearing section 76, the load transmitting and indicating section 72 of the washer 52 includes the spring section 78. The annular spring section 78 is disposed radially outwardly of the bearing section 76 in a coaxial relationship with both the bearing section and the collar 66. The spring section 78 is integrally formed with the bearing section 76 and is connected with the bearing section at a circular bend 154 (see FIG. 2).

The spring section 78 has a top or outer side surface 156 and a bottom or inner side surface 158. The top and bottom surfaces 156 and 158 extend parallel to each other and are frustums of right circular cones having central axes which are coincident with the central axes of the collar 66 and the load transmitting surface 88. The spring section 76 flares radially and axially outwardly in a direction away from the collar 66.

The spring section 78 has an annular end surface 162 which extends perpendicular to the two side surfaces 156 and 158. The circular corner at the junction of the annular axially inner side surface 158 and the radially outer side surface 162 of the spring section 78 intially engages the outer side surface 82 of the wheel 30 as the fastener assembly 20 is tightened (see FIG. 5). Of course, as the force applied against the washer 52 by the nut 50 increases, the spring section 78 is flattened to provide a clear indication of when the predetermined preload force has been applied to the fastener assembly. When the spring section 78 is flattened (FIG. 6), the inner side surface 158 is disposed in flat abutting engagement with the wheel surface 82. At this time, the radially outer surface 162 extends perpendicular to the wheel surface 82.

When the fastener assembly 20 has been tightened on the hub nut 36, the annular end surface 100 of the retainer section 68 (see FIG. 2) on the nut 50 is disposed in a plane which extends between the outer and inner side surfaces 156 and 158 of the flat spring section 78 (FIG. 6). This results in the axial extent of the fastener assembly 20 being minimized when the desired preload force is applied by the nut 50 against the washer 52. It should be noted that at this time the end surface 100 of the nut 50 is spaced from the side surface 82 of the wheel 30 so that all of the preload force is transmitted through the washer 52.

As the spring section 78 is flattened by the application of a desired preload force to the washer 52. The undulations 92, 94 and 96 (see FIG. 3) in the spring section, are also flattened. The inner side surface 158 of the spring section 78 has a crest at the undulation 92 (see FIG. 4). The crest at the undulation 92 extends tangentially to the inner side surface 150 of the bearing section 76 (see FIG. 2). Similarly, the outer side surface 156 of the undulation 92 has a crest which extends tangentially to the outer side surface 148 of the bearing section 76 (FIG. 2). Although only three undulations 92, 94 and 96 have been shown, it is contemplated that any desired number of undulations could be provided in the spring section 78.

Fastener Assembly–Second Embodiment

In the embodiment of the invention shown in FIGS. 1 through 7, the annular force transmitting surface areas 86 and 88 on the nut body 56 and collar 66 have frustoconical configurations. However, it is contemplated that in order to accommodate misalignment between the hub bolt 36 and wheel 30 in the manner shown in FIG. 7, it may be desirable to form the load transmitting surfaces 86 and 88 as portions of spheres having the same radii of curvature. A fastener assembly having this construction is illustrated in the embodiment of the invention shown in FIG. 8. Since the embodiment of the invention shown in FIG. 8 is generally similar to the embodiment of the invention shown in FIGS. 1–7, similar numerals will be utilized to designate similar components, the suffix letter "a" being associated with the embodiment of FIG. 8 in order to avoid confusion.

The fastener assembly 20a constructed in accordance with this embodiment of the invention includes a nut 50a and a washer 52a which are rotatable relative to each other. The nut 50a includes a body 56a upon which wrenching flats or surfaces 58a are disposed. A thread convolution 62a is formed along the side of a passage or central opening which extends through the center of the nut body 56a. The washer 52a has an annular collar 66a which circumscribes a retainer section 68a projecting from one axial end portion of the nut body 56a. The retainer section 68a cooperates with the collar 66a to loosely hold the washer 52a on the nut 50a.

In addition to the collar 66a, the washer 52a has an annular load transmitting and indicating section 72a which projects radially outwardly from the collar 66a. The load transmitting and indicating section 72a includes an annular bearing section 76a which extends across one end of the collar 66a and an annular spring section 78a which flares radially and axially outward from the bearing section 76a. A plurality of undulations 92a are provided in the spring section 78a.

When the spring section 78a is in an unloaded condition, the undulations 92a, which correspond to the undulations 92–96 of the embodiment of the invention shown in FIGS. 1–7, project axially outwardly from the conically flaring spring section 78a toward the collar 66a. Upon tightening of the fastener assembly with the desired preload force, the undulations 92a are resiliently flattened.

In accordance with a feature of this embodiment of the invention, the nut body 56a and collar 66a are provided with annular radially and axially outwardly flaring load transmitting surface areas 86a and 88a which are formed as portions of spheres having the same radii of curvature. This enables the load transmitting surface areas 86a and 88a to be dispoosed in abutting engagement throughout major portions of their surface areas even though the hub bolt and wheel may be slightly misaligned in the manner illustrated schematically in FIG. 7.

The load transmitting surface area 86a on the nut body 56a is formed as a portion of a sphere having a center which is disposed on the central axis of the nut body 56a. The load transmitting surface area 88a on the collar 66a is formed as a portion of a sphere having its center on the central axis of the washer 52a. The two spheres of which the load transmitting surfaces 86a and 88a are portions, have equal diameters. Therefore, the two load transmitting surface areas 86a and 88a will be disposed in tight abutting engagement with each other throughout their circumferential extent even though the hub bolt and wheel may be slightly misaligned.

Fastener Assembly–Third Embodiment

When a nut and bolt are tightened to apply a clamping force against a member without a spring washer between the member and the nut and/or bolt, the clamp load applied against the member increases in a linear manner with increasing torque. It has been established that the use of a spring washer between the nut and/or bolt and the member allows the magnitude of the clamp load to be substantially increased at relatively low torque levels until the resiliency of the spring washer is overcome. The torque then increases rapidly with relatively small increases in clamp load.

In the embodiment of the invention shown in FIGS. 1–7, the spring section 78 is resiliently flattened when the fastener assembly 20 is tightened onto the hub bolt 36. As the spring section 78 is flattened, the clamp load increases rapidly with relatively small increases in torque applied to the nut. However, once the spring section has been flattened, the torque increases rapidly relative to the clamp load. In order to increase the extent of the clamp load which can be applied against a wheel with relatively low torque, the embodiment of the invention shown in FIG. 9 has a washer with a collar which is readily deflected and a force transmitting surface area which extends at an acute angle relative to a force transmitting surface area on the body of the nut. Since this embodiment of the invention is generally similar to the embodiments of the invention shown in FIGS. 1-8, similar numerals will be utilized to designate the similar components, the suffix letter "b" being associated with the numerals of FIG. 9 to avoid confusion.

The fastener assembly 20b of FIG. 9 includes a nut 50b and a washer 52b which are rotatable relative to each other. The nut 50b includes a body 56b upon which wrenching flats or surfaces 58b are disposed in a hexagonal array. A thread convolution 62b is formed on the side of the passage which extends through the center of the nut body 56b.

The washer 52b has an annular collar 66b which circumscribes a retainer section 68b extending from one axial end portion of the nut body 56b. The retainer section 68b cooperates with the collar 66b to loosely hold the washer 52b on the nut 50b.

The washer 52b has an annular load transmitting and indicating section 72b which projects radially outwardly from the collar 66b. The load transmitting and indicating section 72b includes an annular bearing section 76b which extends across one end of the collar 66b and an annular spring section 78b which flares radially and axially outwardly from the bearing section 76b. Undulations 92b having the same construction as the undulations 92, 94 and 96 of the embodiment of the invention shown in FIGS. 1-7, are provided in the spring section 78b. Upon tightening of the fastener assembly 20b with a desired preload force, the undulations 92b are resiliently flattened.

In accordance with a feature of this embodiment of the invention, the collar 66b is resiliently deflectable from an unloaded or initial condition shown in solid lines in FIG. 9 to a fully loaded condition shown in dashed lines in FIG. 9. In order to promote deflection of the collar 66b from the unloaded condition to the loaded condition, a frustoconical force transmitting surface area 86b on the nut body 50b extends transversely to a frustoconical force transmitting surface area 88b on the collar 66b. Thus, the included angle of the right circular cone which is partially defined by the force transmitting surface area 86b on the nut body 50b has a larger included angle than the right circular cone which is partially defined b the force transmitting surface area 88b on the collar 66b. This results in the force transmitting surface area 88b on the collar 66b extending at an acute angle relative to the force transmitting surface area 86b on the nut body 56b. If desired, the force transmitting surface areas 86b and 88b could have spherical configurations, similar to the embodiment of FIG. B, with different arcs of curvature.

When the fastener assembly 20b is tightened, the annular washer 52b moves into initial engagement with the flat side surface of the wheel disk. Continued rotation of the nut 50b relative to the hub bolt results in spring section 78b being resiliently deflected from the frustoconical configuration of FIG. 9 toward a fully flattened configuration. As the nut is tightened, the undulations 92b are flattened in the manner previously explained in regard to the embodiment of the invention shown in FIGS. 1-7.

As the clamp load or force is applied by the fastener assembly 20b and the spring section 78b is being flattened, the collar 66b is resiliently deflected radially and axially toward the load transmitting and indicating section 72b. As this occurs, the collar moves from the initial or unloaded position shown in solid lines in FIG. 9 toward the fully loaded or deflected position shown in dashed lines in FIG. 9. The collar 66a is connected with the spring section 78b in a series relationship. Therefore, the spring section 78b and collar 66a are simultaneously deflected and the resiliency of the collar 66b adds to the resiliency of the spring section 78b to increase the overall resiliency of the washer 52b. By increasing the resiliency of the washer 52b, magnitude of the clamp load or preload force applied against a wheel by the fastener assembly 20b with relatively low torque on the nut 50b is increased.

Figure 10:
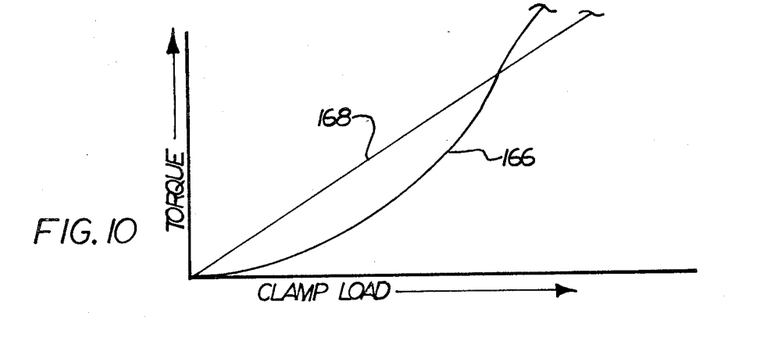
FIG. 10 is a graph schematically illustrating the manner in which clamp load varies with torque for a standard nut and bolt and for the fastener assembly of FIG. 9.
Figures 11, 12, 13:
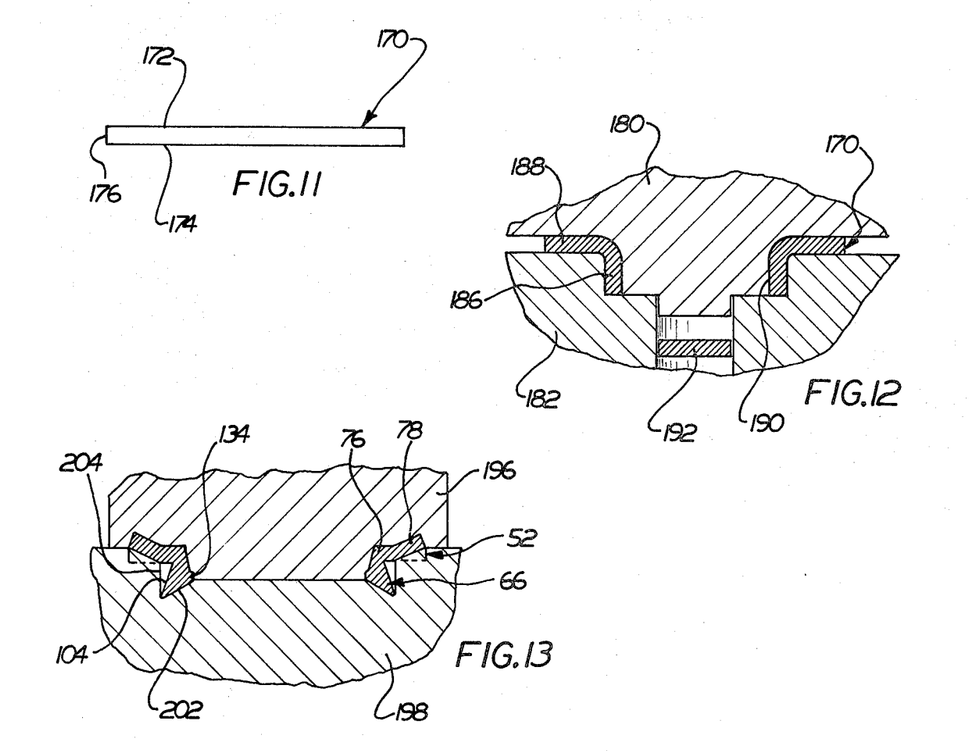
FIG. 11 is an elevational view of a flat piece of sheet metal from which the washer of the fastener assembly of FIGS. 2 and 3 is formed.
FIG. 12 is a schematic illustration depicting punching of an opening in the sheet metal of FIG. 11 and the formation of a cylindrical wall projecting outwardly from the sheet metal.
FIG. 13 is a schematic illustration depicting the manner in which the cylindrical wall is axially compressed and radially expanded to form a collar portion of the washer and the manner in which the sheet metal is bent to form spring and bearing sections of the washer.

The manner in which the clamp load applied by the fastener assembly 20b varies with torque applied to the nut body 56b has been illustrated schematically by the curve 166 in FIG. 10. The manner in which clamp load varies with torque for a fastener assembly which does not include a resiliency deflectable spring washer is illustrated by the straight line 168 in FIG. 10. Thus, if a nut and bolt are inner connected without a spring washer between the nut and/or bore the bolt and the member against which a clamp load is being applied, the clamp load increases in a linear manner with increasing torque as indicated by the straight line 168 in FIG. 10.

Due to the resilient deflection of the bearing section 78b and collar 66b of the washer 52b, the clamp load applied by the fastener assembly 20b against a wheel or other member initially increases rapidly with increasing torque in the manner indicated by curve 166 in FIG. 10. However, as the bearing section 78b approaches its fully flattened condition and the collar 66b approaches the fully deflected condition indicated in dashed lines in FIG. 9, the torque must be increased substantially to effect an increase in the clamp load applied against the member. Of course, once the bearing section 78b has been fully flattened and the collar 66b fully deflected, the relationship between torque and clamp load would vary in a linear manner. It should be understood that the graph of FIG. 10 is for purposes of illustration only and that the actual manner in which the torque and clamp load may vary relative to each other will be slightly different for different fastener assemblies.

Method of Making the Fastener Assembly

In fabricating the fastener assembly, the nut 50 is formed separately from the washer 52. The nut 50 is initially formed with the cylindrical retainer wall 128 extending outwardly to a tapered end portion without the annular retaining rim 130. If the fastener assembly 20 is to be of the externally threaded bolt type rather than the internally threaded nut type shown in the drawings, the retainer wall 128 would extend from the head end or body of the bolt and would have an undercut frustoconical leading end adjacent to one end of the shank of the bolt.

The washer 52 is telescoped over the retainer wall 128. A force is applied against the outer end of the retainer wall 128 to form the radially outwardly projecting rim 130. Once the rim 130 has been formed by cold working the metal of the retainer wall 128, the washer 52 is locked onto the nut 50. Although the washer is only loosely held on the nut 50 and is free to move through limited distances in both axial and radial directions relative to the nut, the washer cannot be separated from the nut.

The washer 52 is formed from a single piece 170 (FIG. 8) of sheet metal. The piece 170 of sheet metal is initially cut to a circular configuration and has parallel major side surfaces 172 and 174 circumscribed by a circular minor side surface 176. Although it is preferred to initially cut the piece of sheet metal 170 to a circular configuration, it is contemplated that the formation of the washer 52 could be initiated from a flat rectangular piece of sheet metal if desired.

The sheet metal 170 is placed between a pair of dies 180 and 182 (see FIG. 9). The dies are brought together to form a cylindrical side wall 186 which extends axially outwardly perpendicular to a base section 188 of the sheet metal. The wall 186 extends around a circular opening 190 formed by removing a circular section 192 from the sheet metal 170.

After the cylindrical wall 186 has been formed in the manner shown in FIG. 9, sheet metal piece 170 is transferred to a second set of dies 196 and 198. The dies 196 and 198 compress the cylindrical side wall 186 to form the collar 66 of the washer 52. In addition, the dies 196 and 198 bend the annular sheet metal base 188 to form the bearing section 76 and spring section 78.

The lower die 198 has a frustoconical tapered surface 202 which applies an axial force against the cylindrical wall 190 to compress the wall axially and expand the wall radially outwardly. As the wall is being compressed axially and expanded radially, the frustoconical load transfer surface 88 is formed. At the same time, the metal in the cylindrical wall is cold worked to form the frustoconical side surface 104 of the washer 52. It should be noted that a space has been provided between the undercut side surface 104 of the collar 66 and a cylindrical inner side surface 204 of the lower die 198. Simultaneously with the forming of the frustoconical outer side surface 104 of the collar, the annular flange 134 is formed on the inside of the collar.

Simultaneously with the forming of the collar 66, the base 188 is bent by the interaction between the two dies 196 and 198. This forms the frustoconical spring section 78 which flares radially and axially away from the bearing section 76. By using the dies to cold work the sheet metal blank 170 to form the washer 52 in this manner, the number of operations and expense of forming the washer tends to be minimized. This is promoted by the fact that the washer is formed in two separate stamping operations rather than a pluraliy of machining operations. However, it is contemplated that other methods of forming the washer 52 could be used if desired.

Summary

In view of the foregoing description it is apparent that the present invention provides new and improved fastener assemblies 20, 20a and 20b which can be used for many different purposes and are particularly well adapted to secure the wheel 30 of a vehicle with a hub 26. Although it is contemplated that fastener assemblies constructed in accordance with this invention could be bolts, in the specific embodiments of the invention described herein, the fastener assemblies includes nuts 50, 50a and 50b and washers 52, 52a and 52b.

In order to minimize the combined axial extent of the nuts 50, 50a and 50b and washers 52, 52a and 52b while at the same time providing relatively large wrenching flats 58, 58a and 58b to enable the nuts to be loosened, axially and radially outwardly flaring spring sections 78, 78a and 78b of the washers are resiliently flattened when predetermined preload forces are applied against the nuts. After the washers 52, 52a and 52b have been flattened, axial end surfaces 100, 100a and 100b of the nuts 50, 50a and 50b are disposed in spaces located between planes containing the top and bottom surfaces of the spring sections 78, 78a and 78b.

Flattening of the washers 52, 52a and 52b provides visual indications that the desired preloads have been applied. In addition, the resilient flattening of the washers 52, 52a and 52b results in locking actions which tend to hold the nuts 50, 50a and 50b against vibrating loose during rotation of the wheel 30. Flattening of the washers 52, 52a and 52b also tends to maximize the surface areas available for transmitting the preload forces and to minimize marring of the wheel 30.

In order to enable the fastener assemblies 20, 20a and 20b to accommodate misalignment between a bolt or stud and the side surface 82 of a wheel 30, the washers 52, 52a and 52b have collars 66, 66a and 66b which loosely engage retainer sections 68, 68a and 68b which extend from axial end portions of the nuts 50, 50a and 50b. Upon tightening of the nuts 50, 50a and 50b onto slightly skewed bolts 36 or studs, the nut bodies 56, 56a and 56b can tilt relative to the washers 52, 52a and 52b. In order to accommodate this tilting action, the preload forces are transmitted between the nuts and the washers by abutting engagement between annular radially and axially outwardly flaring load transmitting surface areas 86, 86a and 86b and 88, 88a and 88b on the bodies of the nuts and the collars of the washers.

The washers 52, 52a and 52b are advantageously provided with an annular load transmitting and indicating sections 72, 72a and 72b which extend radially outwardly from and are coaxial with the collars 66, 66a and 66b. The load transmitting and indicating sections 72, 72a and 72b include bearing sections 76, 76a and 76b having flat annular bottom surfaces and spring sections 78, 78a and 78b which flare radially and axially outwardly from the bearing sections.

Upon tightening of the nuts 50, 50a and 50b, the spring sections are resiliently flattened so that the bottom side surfaces of the spring sections and the bottom surfaces of the bearing sections move into alignment. This provides relatively large areas for transmitting the preload forces between the washers 52, 52a and 52b and the wheel 30. The flattening of the spring sections 78, 78a and 78b also provides a clear indication that the desired preload has been applied to the wheel by fastener assemblies 20, 20a and 20b.

Upon loosening of the fastener assemblies 20, 20a and 20b, the spring sections 78, 78a and 78b spring back from the flattened condition toward the unloaded condition. In order to minimize the overall axial extent of the fastener assemblies 20, 20a and 20b, when the desired preload forces have been applied to the washers 52, 52a and 52b and the spring sections 78, 78a and 78b flattened against the wheel 30, the end surfaces 100, 100a and 100b of retainer sections on the nuts are disposed radially inwardly of the spring and bearing sections of the washers 52, 52a and 52b.

Having described a specific preferred embodiment of the invention, the following is claimed:

1. A fastener assembly for applying a preload force against a member and indicating when the preload force against the member is reduced, said fastener assembly comprising a fastener element, said fastener element including a body, a thread convolution connected to said body and having a central axis which is coincident with a central axis of said body, a retainer section extending from a first axial end portion of said body, and an annular load transmitting surface area disposed on said first axial end portion of said body and flaring radially and axially outwardly from said retainer section in a direction away from said first axial end portion of said body, an annular washer element rotatably secured to said fastener element by said retainer section, said washer element and fastener element being rotatable relative to each other to enable said fastener element to be rotated relative to said washer element to apply a preload force to said washer element while said washer element is in stationary abutting engagement with the member, said washer element including an annular axially projecting collar circumscribing said retainer section of said fastener element, said collar including an annular load transmitting surface area which flares radially and axially outwardly from a location within the collar to a first axial end portion of said collar, said load transmitting surface area of said collar being abuttingly engageable with said annular load transmitting surface area on said body of said fastener element to transmit the predetermined preload force between said fastener element and said washer element, said collar having a circular side surface which flares radially and axially outwardly from a second axial end portion of said collar to the first axial end portion of said collar, said second axial end portion of said collar being disposed opposite from said first axial end portion of said collar, said washer element further including a load transmitting and indicating section connected with the second axial end portion of said collar, said load transmitting and indicating section including a bearing section having annular top and bottom surface areas which extend radially outwardly of said second end portion of said collar, said bottom surface area of said bearing section being adapted to abuttingly engage a side surface area of the member upon application of the preload force to said collar by said fastener element, said load transmitting and indicating section further including an annular spring section circumscribing said bearing section and disposed in a coaxial relationship with said collar, said annular spring section having top and bottom surface areas which flare radially and axially outwardly from said bearing section, said bottom surface area of said spring section being adapted to abuttingly engage the side surface area of the member upon application of the preload force to said collar by said fastener element, said spring section being resiliently deflectable from a first position to a second position upon application of the predetermined preload force to said washer element by said fastener element, said bottom surface area of said spring section being disposed in a plane which extends at an acute angle relative to said bottom surface area of said bearing section when said spring section is in the first position, said bottom surface area of said spring section being resiliently deflected toward alignment with said bottom surface area of said bearing section upon application of the predetermined preload force to said washer element to resiliently flatten said load transmitting and indicating section and provide a visible indication that the predetermined preload force has been applied to said washer element and to enable the preload force to be transmitted from said washer element to the side surface of said member at areas of abutting engagement between the side surface of the member and the bottom surface areas of said spring and bearing sections, said spring section being resiliently movable from the second position toward the first position upon a reduction of the predetermined preload force, said retainer section having an axial end surface area which is disposed in a plane extending between the top and bottom surface areas of said bearing section and between the top and bottom surface areas of said spring section when said load transmitting and indicating section has been flattened and said spring section is in the second position.

2. A fastener assembly as set forth in claim 1 wherein said spring section includes a plurality of undulations which project toward said collar, said undulations having a first amplitude when said spring section is in the first position prior to application of the predetermined preload force to said washer element and being resiliently flattened upon application of the predetermined preload force to said washer element to further indicate that the predetermined preload force has been applied to said washer element.

3. A fastener assembly as set forth in claim 1 wherein said retainer section includes a cylindrical main section projecting axially outward from said first axial end portion of said body and a circular rim section projecting radially outwardly of said main section, said collar having an annular flange section circumscribing said main section of said retainer section, said annular flange section having an inside diameter which is greater than the outside diameter of said main section and less than the outside diameter of said rim section to enable said rim section to engage said flange section to limit the extent of axial movement of said washer element relative to said fastener element.

4. A fastener assembly as set forth in claim 3 wherein said thread convolution extends from said main section into said body of said fastener element.

5. A fastener assembly as set forth in claim 1 wherein said load transmitting surface area on said body has a frustoconical configuration and said load transmitting surface area on said collar has a frustoconical configuration and extends parallel to said load transmitting surface area on said body.

6. A fastener assembly as set forth in claim 1 wherein said collar is movable radially and axially relative to said body to enable said washer element to abuttingly engage the side surface of the member with a central axis of said washer element skewed relative to a central axis of said body and thread convolution.

7. A fastener assembly as set forth in claim 1 wherein said body includes a plurality of flat side surface areas adapted to be engaged by a wrench, said thread convolution being disposed within an opening through said body.

8. A fastener assembly as set forth in claim 1 wherein said annular top surface area of said bearing section has an inside diameter which is less than the outside diameter of said annular load transmitting surface area on said body and greater than the inside diameter of said annular load transmitting surface area on said body.

9. A fastener assembly as set forth in claim 8 wherein said annular top surface area of said bearing section has an outside diameter which is greater than the outside diameter of said annular load transmitting surface area on said body.

10. A fastener assembly as set forth in claim 1 wherein said annular spring section includes a plurality of undulations having amplitudes which increase from zero at a radially inner portion of said annular spring section to a maximum amplitude at a radially outer portion of said spring section.

11. A fastener assembly as set forth in claim 1 wherein said load transmitting surface area on said body has a frustoconical configuration and said load transmitting surface area on said collar has a frustoconical configuration and extends at an acute angle relative to said load transmitting surface area on said body.

12. A thread convolution as set forth in claim 1 wherein said load transmitting surface area on said body forms a portion of a sphere and said load transmitting surface area on said collar forms a portion of a sphere and has the same radius of curvature as said load transmitting surface area on said body.

13. A fastener assembly as set forth in claim 1 wherein said annular load transmitting surface area on said body flares radially and axially outwardly from said retainer section at a first angle relative to the central axis of said body, said annular load transmitting surface area on said collar flaring radially and axially outwardly from the location within said collar to the first axial end portion of said collar at a second angle to the central axis of said collar.

14. A fastener assembly for applying a preload force against a member and indicating when the preload force against the member is reduced, said fastener assembly comprising a fastener element, said fastener element including a body, a thread convolution connected to said body and having a central axis which is coincident with a central axis of said body, a retainer section extending from a first axial end portion of said body, and an annular load transmitting surface area disposed on said first axial end portion of said body and flaring radially and axially outwardly from said retainer section in a direction away from said first axial end portion of said body, an annular washer element rotatably secured to said fastener element by said retainer section, said washer element and fastener element being rotatable relative to each other to enable said fastener element to be rotated relative to said washer element to apply a preload force to said washer element while said washer element is in stationary abutting engagement with the member, said washer element including an annular axially projecting collar circumscribing said retainer section of said fastener element, said collar including an annular load transmitting surface area which flares radially and axially outwardly from a location within the collar to a first axial end portion of said collar, said load transmitting surface area of said collar being abuttingly engageable with said annular load transmitting surface area on said body of said fastener element to transmit the predetermined preload force between said fastener element and said washer element, said washer element further including a load transmitting and indicating section connected with a second axial end portion of said collar opposite from said first axial end portion of said collar, said load transmitting and indicating section including a bearing section having annular top and bottom surface areas which extend radially outwardly of said second end portion of said collar, said annular top surface area of said bearing section having an inside diameter which is less than the outside diameter of said annular load transmitting surface area on said body and greater than the inside diameter of said annular load transmitting surface area on said body, said annular load transmitting surface area on said collar having an outside diameter which is greater than the inside diameter of said top surface of said bearing section, said bottom surface area of said bearing section being adapted to abuttingly engage a side surface area of the member upon application of the preload force to said collar by said fastener element, said load transmitting and indicating section further including an annular spring section circumscribing said bearing section and disposed in a coaxial relationship with said collar, said annular spring section having top and bottom surface areas which flare radially and axially outwardly from said bearing section, said bottom surface area of said spring section being adapted to abuttingly engage the side surface area of the member upon application of the preload force to said collar by said fastener element, said spring section being resiliently deflectable from a first position to a second position upon application of the predetermined preload force to said washer element by said fastener element, said bottom surface area of said spring section being disposed in a plane which extends at an acute angle relative to said bottom surface area of said bearing section when said spring section is in the first position, said bottom surface area of said spring section being resiliently deflected toward alignment with said bottom surface area of said bearing section upon application of the predetermined preload force to said washer element to resiliently flatten said load transmitting and indicating section and provide a visible indication that the predetermined preload force has been applied to said washer element and to enable the preload force to be transmitted from said washer element to the side surface of said member at areas of abutting engagement between the side surface of the member and the bottom surface areas of said spring and bearing sections, said spring section being resiliently movable from the second position toward the first position upon a reduction of the predetermined preload force, said retainer section having an axial end surface area which is disposed in a plane extending between the top and bottom surface areas of said bearing section and between the top and bottom surface areas of said spring section when said load transmitting and indicating section has been flattened and said spring section is in the second position.

15. A fastener assembly as set forth in claim 14 wherein said collar has a circular side surface which flares radially and axially outwardly from the second axial end portion of said collar to the first axial end portion of said collar.

16. A fastener assembly as set forth in claim 14 wherein said spring section includes a plurality of undulations which project toward said collar, said undulations having a first amplitude when said spring section is in the first position prior to application of the predetermined preload force to said washer element and being resiliently flattened upon application of the predetermined preload force to said washer element to further indicate that the predetermined preload force has been applied to said washer element.

17. A fastener assembly as set forth in claim 14 wherein said annular spring section includes a plurality of undulations having amplitudes which increase from zero at a radially inner portion of said annular spring section to a maximum amplitude at a radially outer portion of said spring section.

18. A fastener assembly as set forth in claim 17 wherein a crest portion of a bottom surface area of each of said undulations extend tangentially to a plane of the bottom surface of said bearing section.

19. A fastener assembly as set forth in claim 14 wherein said load transmitting surface area on said body has a frustoconical configuration and said load transmitting surface area on said collar has a frustoconical configuration and extends at an acute angle relative to said load transmitting surface area on said body.

20. A thread convolution as set forth in claim 14 wherein said load transmitting surface area on said body forms a portion of a sphere and said load transmitting surface area on said collar forms a portion of a sphere and has the same radius of curvature as said load transmitting surface area on said body.

21. A fastener assembly as set forth in claim 14 wherein said annular load transmitting surface area on said body flares radially and axially outwardly from said retainer section at a first angle relative to the central axis of said body, said annular load transmitting surface area on said collar flaring radially and axially outwardly from the location within said collar to the first axial end portion of said collar at a second angle to the central axis of said collar.

22. A fastener assembly as set forth in claim 21 wherein said first angle is greater than said second angle.

23. A fastener assembly as set forth in claim 22 wherein said first and second load transmitting surface areas have frustoconical configurations.

24. A fastener assembly for applying a preload force against a member and indicating when the preload force against the member is reduced, said fastener assembly comprising a fastener element, said fastener element including a body, a thread convolution connected to said body and having a central axis which is coincident with a central axis of said body, a retainer section extending from a first axial end portion of said body, and an annular load transmitting surface area disposed on said first axial end portion of said body and flaring radially and axially outwardly from said retainer section in a direction away from said first axial end portion of said body, an annular washer element rotatably secured to said fastener element by said retainer section, said washer element and fastener element being rotatable relative to each other to enable said fastener element to be rotated relative to said washer element to apply a preload force to said washer element while said washer element is in stationary abutting engagement with the member, said washer element including an annular axially projecting collar circumscribing said retainer section of said fastener element, said collar including an annular load transmitting surface area which flares radially and axially outwardly from a location within the collar to a first axial end portion of said collar, said load transmitting surface area of said collar being abuttingly engageable with said annular load transmitting surface area on said body of said fastener element to transmit the predetermined preload force between said fastener element and said washer element, said washer element further including a load transmitting and indicating section connected with a second axial end portion of said collar opposite from said first axial end portion of said collar, said load transmitting and indicating section including a bearing section having annular top and bottom surface areas which extend radially outwardly of said second end portion of said collar, said bottom surface area of said bearing section being adapted to abuttingly engage a side surface area of the member upon application of the preload force to said collar by said fastener element, said load transmitting and indicating section further including an annular spring section circumscribing said bearing section and disposed in a coaxial relationship with said collar, said annular spring section having top and bottom surface areas which flare radially and axially outwardly from said bearing section, said bottom surface area of said spring section being adapted to abuttingly engage the side surface area of the member upon application of the preload force to said collar by said fastener element, said spring section being resiliently deflectable from a first position to a second position upon application of the predetermined preload force to said washer element by said fastener element, said bottom surface area of said spring section being disposed in a plane which extends at an acute angle relative to said bottom surface area of said bearing section when said spring section is in the first position, said bottom surface area of said spring section being resiliently deflected toward alignment with said bottom surface area of said bearing section upon application of the predetermined preload force to said washer element to resiliently flatten said load transmitting and indicating section and provide a visible indication that the predetermined preload force has been applied to said washer element and to enable the preload force to be transmitted from said washer element to the side surface of said member at areas of abutting engagement between the side surface of the member and the bottom surface areas of said spring and bearing sections, said spring section being resiliently movable from the second position toward the first position upon a reduction of the predetermined preload force, said annular spring section having a plurality of undulations with amplitudes which increase from zero at a radially inner portion of said annular spring section to a maximum amplitude at a radially outer portion of said spring section, a crest portion of a bottom surface area of each of said undulations extends tangentially to a plane of the bottom surface of said bearing section, said retainer section having an axial end surface area which is disposed in a plane extending between the top and bottom surface areas of said bearing section and between the top and bottom surface areas of said spring section when said load transmitting and indicating section has been flattened and said spring section is in the second position.

25. A fastener assembly as set forth in claim 24 wherein said annular top surface area of said bearing section has an inside diameter which is less than the outside diameter of said annular load transmitting surface area on said body and greater than the inside diameter of said annular load transmitting surface area on said body.

26. A fastener assembly as set forth in claim 25 wherein said annular top surface area of said bearing section has an outside diameter which is greater than the outside diameter of said annular load transmitting surface area on said body.

27. A fastener assembly as set forth in claim 25 wherein said annular load transmitting surface area on said collar has an outside diameter which is greater than the inside diameter of said top surface of said bearing section.

28. A fastener assembly as set forth in claim 24 wherein said annular load transmitting surface area on said body flares radially and axially outwardly from said retainer section at a first angle relative to the central axis of said body, said annular load transmitting surface area on said collar flaring radially and axially outwardly from the location within said collar to the first axial end portion of said collar at a second angle to the central axis of said collar.

29. A fastener assembly as set forth in claim 28 wherein said first angle is greater than said second angle.

30. A fastener assembly as set forth in claim 29 wherein said first and second load transmitting surface areas have frustoconical configurations.

31. A fastener assembly as set forth in claim 24 wherein said collar has a circular side surface which flares radially and axially outwardly from the second axial end portion of said collar to the first axial end portion of said collar.

32. A fastener assembly for applying a preload force against a member and indicating when the preload force against the member is reduced, said fastener assembly comprising a fastener element, said fastener element including a body, a thread convolution connected to said body and having a central axis which is coincident with a central axis of said body, a retainer section extending from a first axial end portion of said body, and an annular load transmitting surface area disposed on said first axial end portion of said body and flaring radially and axially outwardly from said retainer section in a direction away from said first axial end portion of said body, an annular washer element rotatably secured to said fastener element by said retainer section, said washer element and fastener element being rotatable relative to each other to enable said fastener element to be rotated relative to said washer element to apply a preload force to said washer element while said washer element is in stationary abutting engagement with the member, said washer element including an annular axially projecting collar circumscribing said retainer section of said fastener element, said collar including an annular load transmitting surface area which flares radially and axially outwardly from a location within the collar to a first axial end portion of said collar, said load transmitting surface area of said collar being abuttingly engageable with said annular load transmitting surface area on said body of said fastener element to transmit the predetermined preload force between said fastener element and said washer element, said annular load transmitting surface area on said body flaring radially and axially outwardly from said retainer section at a first angle relative to the central axis of said body, said annular load transmitting surface area on said collar flaring radially and axially outwardly from the location within said collar to the first axial end portion of said collar at a second angle to the central axis of said collar, said first angle being greater than said second angle, said washer element further including a load transmitting and indicating section connected with a second axial end portion of said collar opposite from said first axial end portion of said collar, said load transmitting and indicating section including a bearing section having annular top and bottom surface areas which extend radially outwardly of said second end portion of said collar, said bottom surface area of said bearing section being adapted to abuttingly engage a side surface area of the member upon application of the preload force to said collar by said fastener element, said load transmitting and indicating section further including an annular spring section circumscribing said bearing section and disposed in a coaxial relationship with said collar, said annular spring section having top and bottom surface areas which flare radially and axially outwardly from said bearing section, said bottom surface area of said spring section being adapted to abuttingly engage the side surface area of the member upon application of the preload force to said collar by said fastener element, said spring section being resiliently deflectable from a first position to a second position upon application of the predetermined preload force to said washer element by said fastener element, said bottom surface area on said spring section being disposed in a plane which extends at an acute angle relative to said bottom surface area of said bearing section when said spring section is in the first position, said bottom surface area of said spring section being resiliently deflected toward alignment with said bottom surface area of said bearing section upon application of the predetermined preload force to said washer element to resiliently flatten said load transmitting and indicating section and provide a visible indication that the predetermined preload force has been applied to said washer element and to enable the preload force to be transmitted from said washer element to the side surface of said member at areas of abutting engagement between the side surface of the member and the bottom surface areas of said spring and bearing sections, said spring section being resiliently movable from the second position toward the first position upon a reduction of the predetermined preload force, said retainer section having an axial end surface area which is disposed in a plane extending between the top and bottom surface areas of said bearing section and between the top and bottom surface areas of said spring section when said load transmitting and indicating section has been flattened and said spring section is in the second position.

33. A fastener assembly as set forth in claim 32 wherein said first and second load transmitting surface areas have frustoconical configurations.

34. A fastener assembly as set forth in claim 32 wherein said annular spring section includes a plurality of undulations having amplitudes which increase from zero at a radially inner portion of said annular spring section to a maximum amplitude at a radially outer portion of said spring section, a crest portion of a bottom surface area of each of said undulations extending tangentially to a plane of the bottom surface of said bearing section.

35. A fastener assembly as set forth in claim 32 wherein said collar has a circular side surface which flares radially and axially outwardly from the second axial end portion of said collar to the first axial end portion of said collar.

36. A fastener assembly as set forth in claim 32 wherein said spring section includes a plurality of undulations which project toward said collar, said undulations having a first amplitude when said spring section is in the first position prior to application of the predetermined preload force to said washer element and being resiliently flattened upon application of the predetermined preload force to said washer element to further indicate that the predetermined preload force has been applied to said washer element.

37. A fastener assembly as set forth in claim 32 wherein said collar is movable radially and axially relative to said body to enable washer element to abuttingly engage the side surface of the member with a central axis of said washer element skewed relative to a central axis of said body and thread convolution.

* * * * *